(12) United States Patent
Paya et al.

(10) Patent No.: US 6,993,663 B1
(45) Date of Patent: Jan. 31, 2006

(54) INPUT BUFFER OVERRUN CHECKING AND PREVENTION

(75) Inventors: Cem Paya, Kirkland, WA (US); Sanjay G. Shenoy, Redmond, WA (US); Louis Lafreniere, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 09/653,618

(22) Filed: Aug. 31, 2000

(51) Int. Cl.
*G06F 11/30* (2006.01)
*H04L 9/00* (2006.01)
(52) U.S. Cl. .................. 713/200; 711/163; 711/164
(58) Field of Classification Search ............. 713/200, 713/201, 202; 710/57; 717/127; 326/16; 711/163, 164
See application file for complete search history.

(56) References Cited

U.S. PATENT DOCUMENTS

| | | | | |
|---|---|---|---|---|
| 5,454,089 A | * | 9/1995 | Nguyen et al. | 711/213 |
| 5,615,343 A | * | 3/1997 | Sarangdhar et al. | 710/112 |
| 6,346,822 B2 | * | 2/2002 | Nishikawa | 326/16 |
| 6,438,666 B2 | * | 8/2002 | Cassagnol et al. | 711/163 |
| 6,519,702 B1 | * | 2/2003 | Williams | 713/201 |
| 6,578,094 B1 | * | 6/2003 | Moudgill | 710/57 |
| 6,651,171 B1 | * | 11/2003 | England et al. | 713/193 |
| 2002/0170034 A1 | * | 11/2002 | Reeve et al. | 717/127 |

* cited by examiner

*Primary Examiner*—Ayaz Sheikh
*Assistant Examiner*—Arezoo Sherkat
(74) *Attorney, Agent, or Firm*—Merchant & Gould P.C.

(57) ABSTRACT

A method, apparatus, and article of manufacture for detecting and preventing input data buffer overrun storing a security token containing a randomly generated data pattern in memory between an input data buffer and memory locations containing instruction address pointers. First one pushes all arguments to a function onto the stack data structure and pushes a return address onto the stack data structure for use in obtaining the memory address for the instruction to be executed upon completion of the function before it pushes onto the stack data structure a security token. This security token comprises a randomly generated data value. Next one allocates memory locations on the stack data structure for use as local variables within the function, completes the instructions within the function, retrieves the security token value from the stack data structure; and if the retrieved security token value is identical to the randomly generated data value, returns from the function using the return address stored on the stack data structure.

14 Claims, 6 Drawing Sheets

```
                  (* Call to Subroutine FOO *)
                                  push  ARG_1
                                  push  ARG_2
                      *
                      *
                      *
                                  push ARG_n
                                  push Return_Addr
                                  go to
  Return_Addr:                    -- Next Instruction --
```

Fig. 5

```
  FOO:      -- Subroutine using Large Input Buffer --
            SET_FRAME_REGISTER
            push Security_Token
            allocate locals
            allocate_locals_Containing_Addr_Pointer (*  --    FOO FUNCTIONAL CODE IS HERE              -- *)

pop Security_Token
            Verify Security_Token value
            if (FAIL) ABORT_PROGRAM
               else Return
```

INPUT BUFFER OVERRUN CHECKING AND PREVENTION

TECHNICAL FIELD

This application relates in general to a method, apparatus, and article of manufacture for preventing overrun of an input data buffer, and more particularly to a method, apparatus, and article of manufacture for detecting and preventing input data buffer overrun storing a security token.

BACKGROUND

With the widespread use of the Internet as a programming vehicle, software developers are increasingly encountering circumstances in which their software interacts with individuals who either are unsophisticated in their use of computers or are malicious in their intent to gain access to remote computing systems. These programmers develop software modules which interact with and accept data from an infinite number of potential users. As such, the assumptions that users may be well-trained, or that users will behave in a particular manner, may not be well-founded.

One area in which an increasingly large number of situations where unsophisticated or malicious users may cause problems to software written for the Internet arises when software developers locate input data buffers within memory locations that are adjacent to a location containing instruction addresses. Typically this situation arises when return addresses are pushed onto a system stack where the system stack is also used as a location to store local variables for functions called during a program's operation.

In such a situation, a user may over write the input buffer by providing more data for storage within the buffer than the programmer has expected. Because programmers have typically allocated input buffers which are "more than large enough" to hold the expected data, the over writing of the input buffers results in the over writing of other memory locations containing other variables. When the other variables that are over written contain addresses for instructions, the behavior of the program in question is unpredictable as these over written addresses are used as to obtain instructions from incorrect locations.

Various methods to alleviate this situation have been suggested over time. First, a system that separates the address data from variable data in different places within memory has been suggested. With such an arrangement, the system would not be able to execute instructions based upon addresses stored within memory locations within the input buffer area. This arrangement is unsatisfactory as it would require a significant reallocation of the manner in which data and instructions are stored within the memory of a computing system. As such, newly written code may not be compatible with previously written modules.

Another method of eliminating this problem is to prevent the execution of instructions which are located within a system stack. This solution would eliminate the problem in which instructions are mistakenly or maliciously placed onto the stack for execution on a buffer is over written; however, the solution also requires a significant overhead associated with a mechanism that determines whether an instruction being fetched is stored on a system stack.

Any solution to this problem must provide a mechanism by which a buffer overrun circumstance is reliable detected while not imposing significant performance overhead requirements upon the processing modules that utilize the mechanism.

SUMMARY

To overcome the limitations in the prior art described above, and to overcome other limitations that will become apparent upon reading and understanding the present specification, the present invention discloses a method, apparatus, and article of manufacture for preventing overrun of an input data buffer.

The present invention solves the above-described problems by providing a method, apparatus, and article of manufacture for detecting and preventing input data buffer overrun storing a security token containing a randomly generated data pattern in memory between an input data buffer and memory locations containing instruction address pointers.

In accordance with the principles of the present invention a method prevents overrun of an input data buffer within a computer program having the input data buffer on a stack data structure. The method pushes all arguments to a function onto the stack data structure and pushes a security token onto the stack data structure. The method pushes a return address onto the stack data structure for use in obtaining the memory address for the instruction to be executed upon completion of the function before it pushes the security token onto the stack data structure. This security token may be a randomly generated data value. The method next allocates memory locations on the stack data structure for use as local variables within the function, completes the instructions within the function, and retrieves the security token value from the stack data structure. If the retrieved security token value is identical to the randomly generated data value, returns from the function using the return addresses are stored on the stack data structure.

Other embodiments of a system in accordance with the principles of the invention may include alternative or optional additional aspects. One such aspect of the present invention is an apparatus for preventing overrun of an input data buffer within a program having the input data buffer on a stack data structure. This apparatus has a function call module for placing any arguments to a function and a return address onto the stack data structure. The apparatus also has a push security token module for placing onto the stack data structure a security token, the security token has a randomly generated data value. A perform function module performs the operations within the function, the perform function module allocates memory locations on the stack data structure for use as the input data buffer. A pop security token module retrieves the security token from the stack data structure upon completion of the operation of the perform function module. A test module compares the retrieved security token with the randomly generated data value, and a complete function module completes the operation of the function. The complete function module returns from the function if the retrieved security token is determined to be identical to the randomly generated data value by the test module.

Another aspect of the present invention is a computer program product readable by a computing system and encoding a set of computer instructions for a computer process preventing overrun of an input data buffer within a program having the input data buffer on a stack data structure. The process pushes a return address onto the stack data structure for use in obtaining the memory address for the instruction to be executed upon completion of the function and pushes onto the stack data structure a security token, the security token comprises a randomly generated data value. The process then completes instructions within the function and retrieves the security token value from the stack data structure. If the retrieved security token value is identical to the randomly generated data value, return from the function using the return address stored on the stack data structure.

These and various other advantages and features of novelty which characterize the invention are pointed out with particularity in the claims annexed hereto. However, for a better understanding of embodiments of the invention, reference should be made to the drawings and to accompanying descriptive matter.

BRIEF DESCRIPTION OF THE DRAWINGS

Referring now to the drawings in which like reference numbers represent corresponding parts throughout.

DETAILED DESCRIPTION OF THE INVENTION

The present invention provides a method, apparatus, and article of manufacture for detecting and preventing input data buffer overrun by storing a security token containing a randomly generated data pattern in memory between an input data buffer and memory locations containing instruction address pointers.

Figure 1:
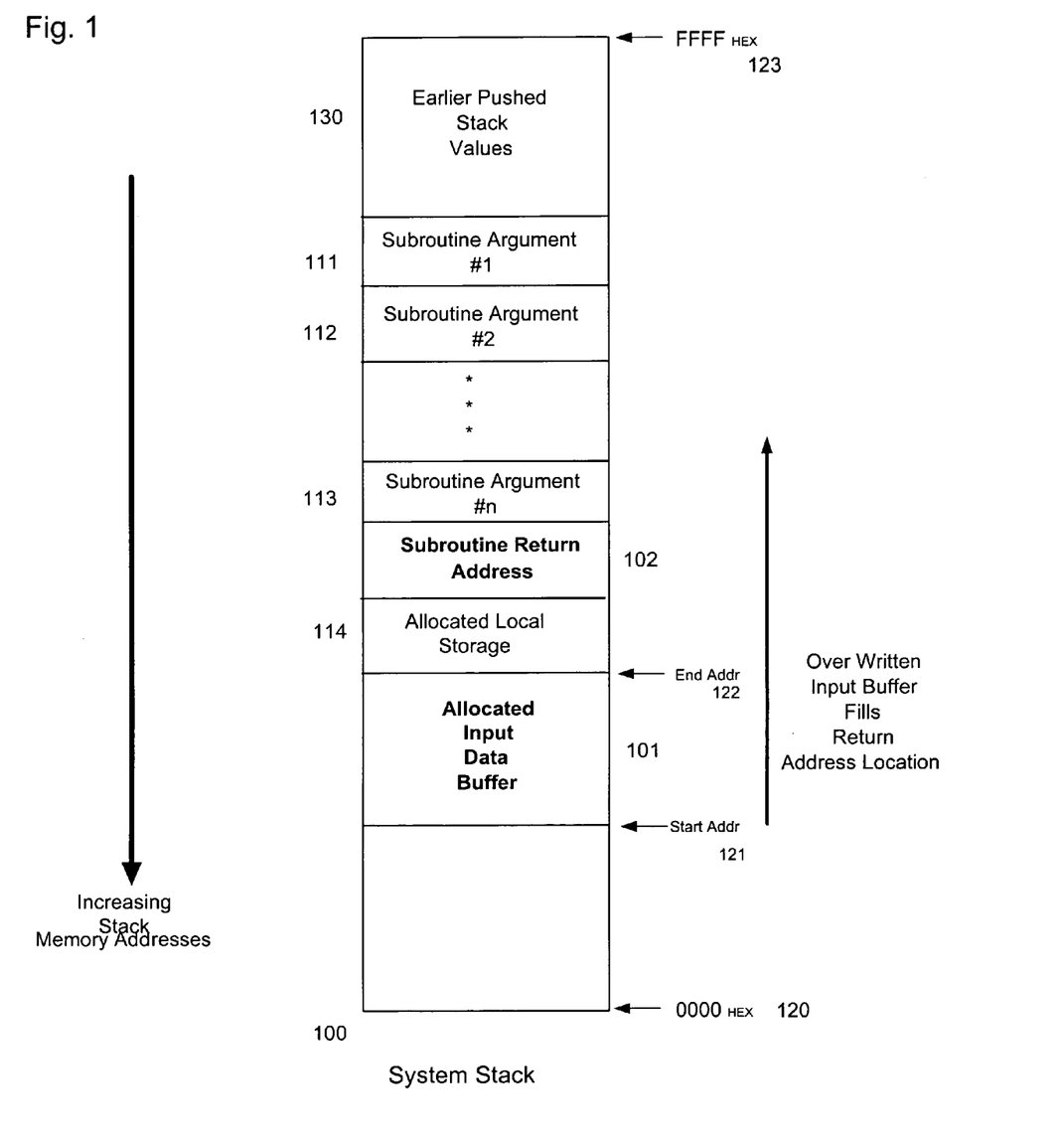
FIG. 1 illustrates a system stack data structure containing data structures used when an example function call is typically performed

FIG. 1 illustrates a system stack data structure containing data structures used when an example function call is performed according to one exemplary embodiment of the present invention. The system stack 100 is a block of memory within the system memory of a computing system in which to get items are stored using push and pop instructions. The stack 100 is a last-in and first-out (LIFO) data structure. In an exemplary embodiment, the beginning of the stack 100 is located at a high memory address 123 where the act of pushing data values onto the stack places these values at successive memory locations with decreasing addresses.

When the subroutine function call is executed, one or more subroutine arguments 111–113 are pushed onto the stack 100. Next, a subroutine return address 102 is pushed on to the system stack 100. The subroutine return address 102 provides the address of the instructions which is to be executed when the function calls is completed. The return from the function call obtains the subroutine return address 102 from the system stack 100 and branches to the address stored within the subroutine return address 102.

When the function call begins executing, storage locations are allocated on the system stack 100 for use in storing local variables used by the function call. These local variables may include one or more locally allocated storage variables 114 and an allocated input data buffer 101. The allocated local storage 114 consists of any number of single variables and complex structures, known as structs, that are referenced by the instructions executing within the function call. In contrast, the allocated input data buffer 101 consists of a contiguous block of storage bytes in which input data is stored and receive from a user.

The allocated input data buffer 101 typically possesses a start address 121 and address 122 and utilizes all of the storage locations between the start and end address. When the input data is received from a user, the function call begins storing the input data at a location corresponding to the start address 121 and continues to fill the buffer 101 until all of the input data has been received. Typically, the allocated input data buffer 101 has been sized to be larger than the amount of input data expected from a user.

This arrangement leads to a potential problem when the amount of data received from a user exceeds the storage capacity of the allocated input data buffer 101. In such a case, the additional input data is stored onto the stack 100 over writing the data values stored in the allocated local storage 114, the subroutine return address 102, the subroutine arguments 111–113, and any other data values stored on the stack. This situation causes a system error when the function call attempts to return upon completion of its operations. The function call branches to the address stored within the subroutine return address 102 that now contains input data that over wrote the previously stored return address 102.

The above system error occurs because input data routines typically do not check to see whether input received from a user exceeds the allocated storage of an input data buffer 101. This system error has been exploited by malicious programmers, or hackers, to gain access to the execution of a computing system. The hackers insert executable code into the allocated input data buffer 101 and then store the address of the beginning of the input data buffer 101 into a number of memory locations on the system stack 100. When the function call attempts to return from its operation, this address pointing to the beginning of the allocated input data buffer 101 is now stored within the subroutine return address location 102. The return from the function call is equivalent to a branch operation to the beginning of the hackers' code stored within the allocated input data buffer 101. Using this technique, hackers have gained access to the execution of code within computing systems.

This system error could be eliminated by having the developer of the function calls perform size checking on the input data as it is received from the user. Because not all developers typically follow a disciplined and structured programming techniques such as this, another solution is needed to eliminate this system error, and the corresponding threat it exposes to hackers.

Figure 2:
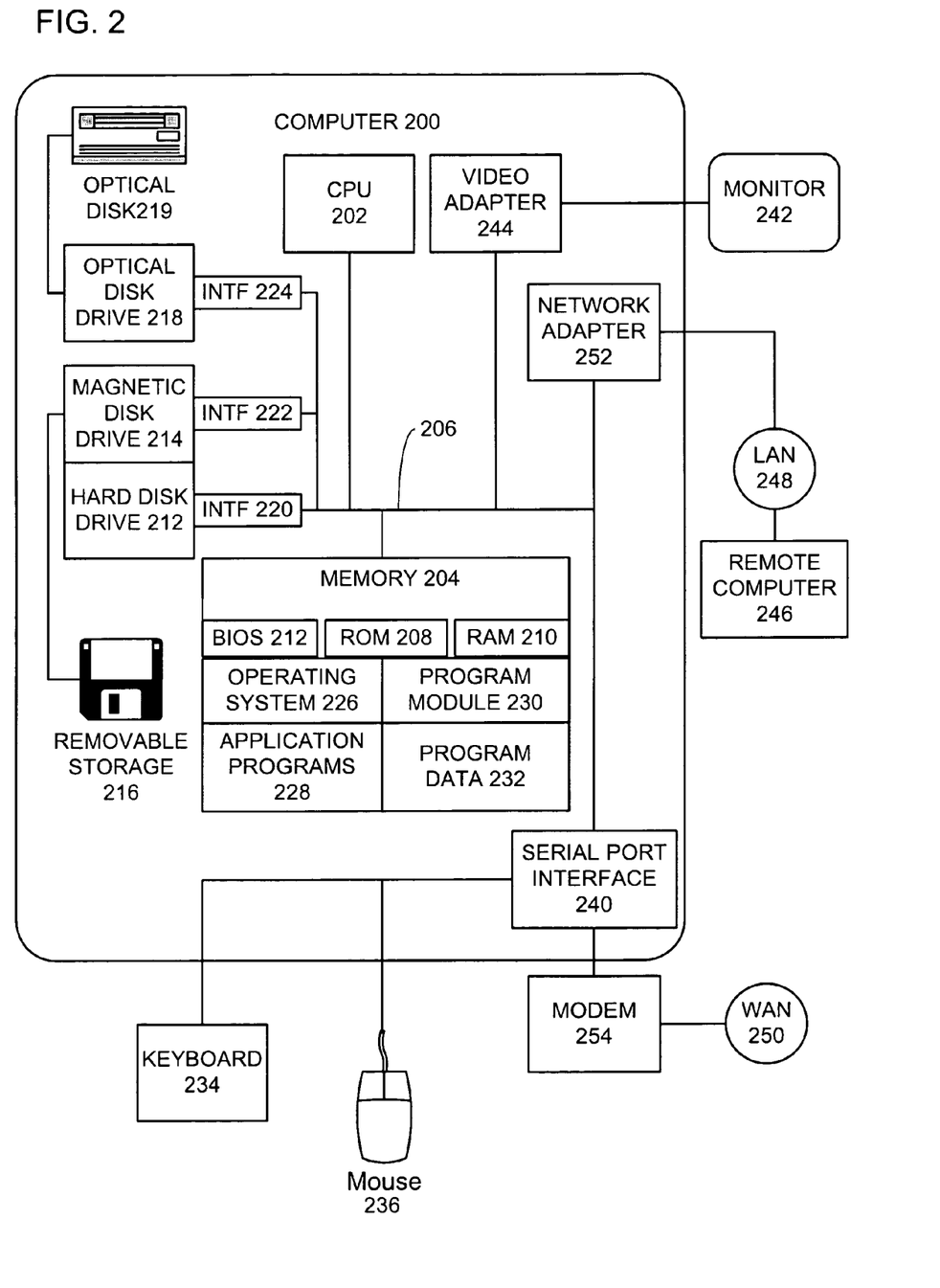
FIG. 2 illustrates a general purpose computing system for use in implementing as one or more computing embodiments of the present invention.

With reference to FIG. 2, an exemplary system for implementing the invention includes a general-purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
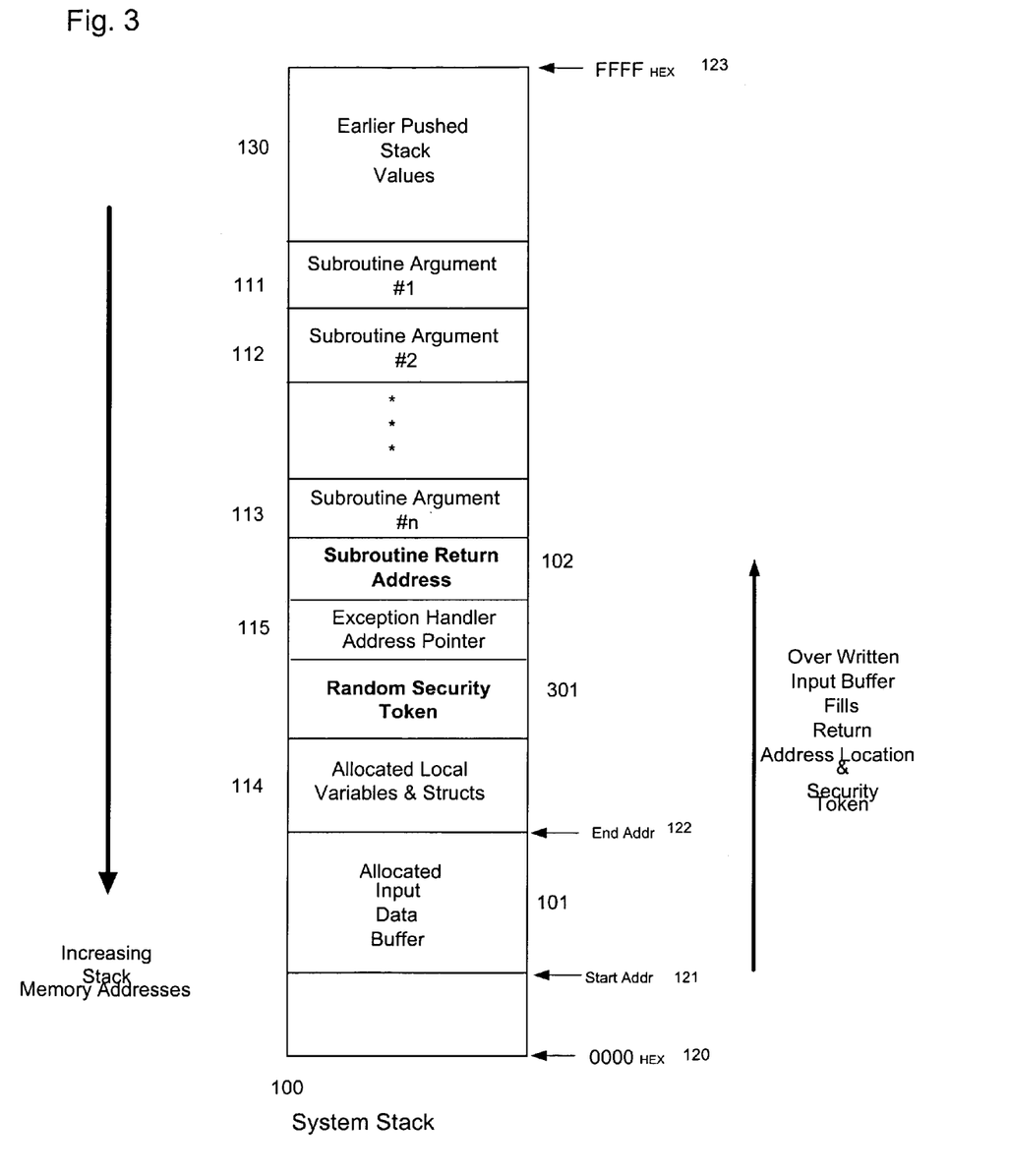
FIG. 3 illustrates a system stack data structure containing data structures, including a security token containing random data values, used when a function call is performed according to one exemplary embodiment of the present invention.

FIG. 3 illustrates a system stack data structure containing data structures, including a security token containing random data values, used when a function call is performed according to one exemplary embodiment of the present invention. The system stack 100 contains the data items used when a function call is performed within a computing system. Additional data items have been included within the stack 100. These additional items include an exception handler address pointer 115 the and a random security token 301. The exception handler address pointer 115 provides an address for a routine to be executed should a processing exception be detected by a computing system during the execution of the function call. This address pointer 115 typically is automatically inserted by many compilers without a developer needing to specify the details of the exception routines.

The random security token 301 provides a data item on the system stack 100 that permits a determination by the function call as to whether the allocated input data buffer 101 has been over written. Because the random security token 301 is pushed onto the system stack 100 before any local variables and structs 114 and any input data buffer 101 are allocated for use by the function call, the condition, in which an input data buffer 101 is over written, causes the random security token 301 to be overwritten prior to the overwriting of the subroutine return address 102. As such, the function call may check the random security token 301 before returning to its calling routine and return only if the random security token 301 contains the data value previously stored on the system stack 100.

When the function call detects that the random security token 301 has been altered, the function call aborts the operation of the program. The program needs to be aborted as the change in the random security token 301 indicates that the stack no longer contains data that may be trusted. The only sure way to restore the data values on the system stack 100 is to abort the execution of the program and restart its operation so that the system stack 100 may be reinitialized. As part of this program abort operation, other operations such as error loading, report generation, and similar diagnostic operations may be performed in an attempt to provide information explaining the program-on-board operation to a user.

Figure 4:
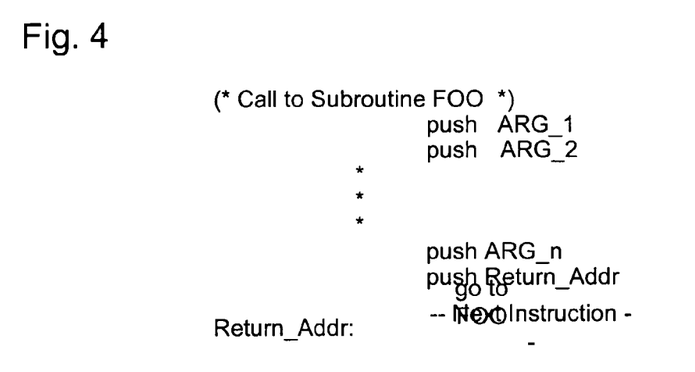
FIG. 4 illustrates sample software code used to implement a function call to an example function FOO according to an exemplary embodiment of the present invention.

FIG. 4 illustrates sample software code used to implement a function call to an example function FOO according to an example of an embodiment of the present invention. The set of instructions illustrated in FIG. 4 represents assembly language instructions corresponding to a call operation to a subroutine named FOO. All of the arguments to subroutine FOO are first pushed onto the system stack 100. Next the return address, the address where the execution should return once subroutine FOO has completed, it's also pushed onto the stack. Finally a branch operation to the FOO routine is performed. Typically the return address, which is pushed onto the stack, corresponds to the next address following the Branch to FOO instruction. In fact, the push a return address operation, when performed in combination with the branch to FOO address, is automatically performed in some assembly languages as a call to subroutine FOO instruction.

Figure 5:
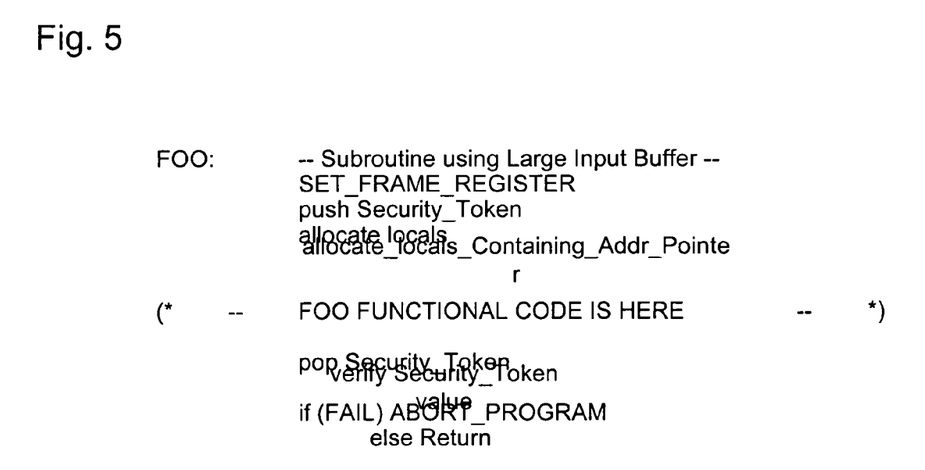
FIG. 5 illustrates sample software code used to implement an example function FOO according to another exemplary embodiment of the present invention.

FIG. 5 illustrates sample software code used to implement an example function FOO according to another example of an embodiment of the present invention. Once within function FOO, the function call performs a set of operations. These operations include setting the frame register, pushing the security token 301 onto the system stack 100, allocating local variables and structs 114, and allocating local variables containing address pointers 114.

With these operations performed, the function FOO may now perform instructions to implement the desired functionality. These instructions may be as simple or complex as necessary and may include additional function calls which utilize the buffer overrun detection and prevention operations according to the present invention.

When the function FOO has completed all of its operations, the function ends with a final set of instructions related to the overrun detection and prevention operations. These instructions include popping the security token 301 off of the system stack 100, verifying the security token's value, and if the verification operations has failed branching to an abort program routine. If the verification operation was successful, the function FOO returns normally using a subroutine return address 102 from the system stack 100.

In order to prevent a malicious programmer, or hacker, from determining the value of the security token 301 and placing its value at the appropriate location within this stack 100 while still altering the subroutine return address 102, the value stored within the security token location 301 is a randomly generated value that is generated at runtime for the particular program in question. Using a randomly generated security token 301, the hacker may not predict the value which needs to be stored within the security tokens location 301 in the system stack 100. As long as the security tokens value is generated each time a program is executed, the value stored in the system stack 100 will be equally likely to any other value that may be stored and used as a security token 301.

The size of the security token 301 may be increased to any particular length to permit the number of possible combinations for the value of the security token 301 to be as large as possible given the security requirements of a given program. Larger values or lengths for the security token 301 will have more combinations of possible values and thus will be harder to guess. Of course, larger values for the security token 301 require the use of additional memory locations in the system stack 100. One skilled in the art will readily recognize how the length of the security token 301 may be changed to obtain a desired probability that a hacker may randomly guess a security token's value being used at the present time.

Additionally, the use of the security token 301 imposes a processing overhead associated with the insertion of the security token 301 onto the stack as well as associated with the verification that the security token 301 has not altered. For functions in which input data is not accepted from a user, this processing overhead may not be necessary. Additionally, function calls which do not contain large input data buffers 101 are less likely to need the processing associated with the buffer overrun detection and prevention procedures.

The insertion of the instructions needed to implement the input buffer overrun detection and prevention procedures, as discussed above, are straightforward enough to be included within instructions generated by a compiler when generating an set of assembly language instructions from a higher level language. The compiler may wish to detect whether it would be appropriate to insert these additional instructions to implement the input buffer overrun detection and prevention procedures before the instructions are inserted into the generated assembly language. As such, the compiler may automatically insert the necessary instructions needed to implement the buffer overrun detection and prevention procedures only when the functions are enabled and only when a large input data buffer, that may create a buffer overrun situation, is present. In this way, the performance penalty required to implement the input buffer overrun detection and prevention procedures may be minimized while still covering the majority of situations in which the error condition arise.

In an exemplary embodiment, a compiler is instructed whether to insert these instructions into functions using an input switch specified by a developer at compile time. If this switch is set, the necessary instruction code will be in asserted if appropriate. If this switch is not set, the instructions which implement the buffer overrun detection and prevention procedures will never be inserted in the compiled code.

When the switch is set to insert the instructions needed to implement buffer overrun detection and prevention procedures, the compiler performs an additional check to determine if the function being compiled is likely to give rise to the error condition discussed above. The compiler will determine if the function in question is allocating a data structure large enough to qualify as a large input data buffer 101 pursuant to the present invention. The compiler makes such a determination by a checking whether it is allocating a local variable or local struct greater than a predetermined size. In the exemplary embodiment, the compiler will insert the buffer overrun detection and prevention and instructions into functions having array variables or structs greater than eight bytes. The value of eight bytes has been found to eliminated most, if not all, system errors of the type discussed above without imposing a significantly measurable performance penalty to the processing overhead associated with these operations. Of course, the processing overhead may be further reduced by increasing the size from eight bytes to a larger number; however, these situations which may give rise to a system error being missed. One skilled in the art will readily understand and appreciate the trade-offs between the size of a data structure which would qualify as a large input buffer that needs to use the buffer overrun procedures to the overhead associated with the performance of these additional instructions used to implement the buffer overrun procedures.

Figure 6:
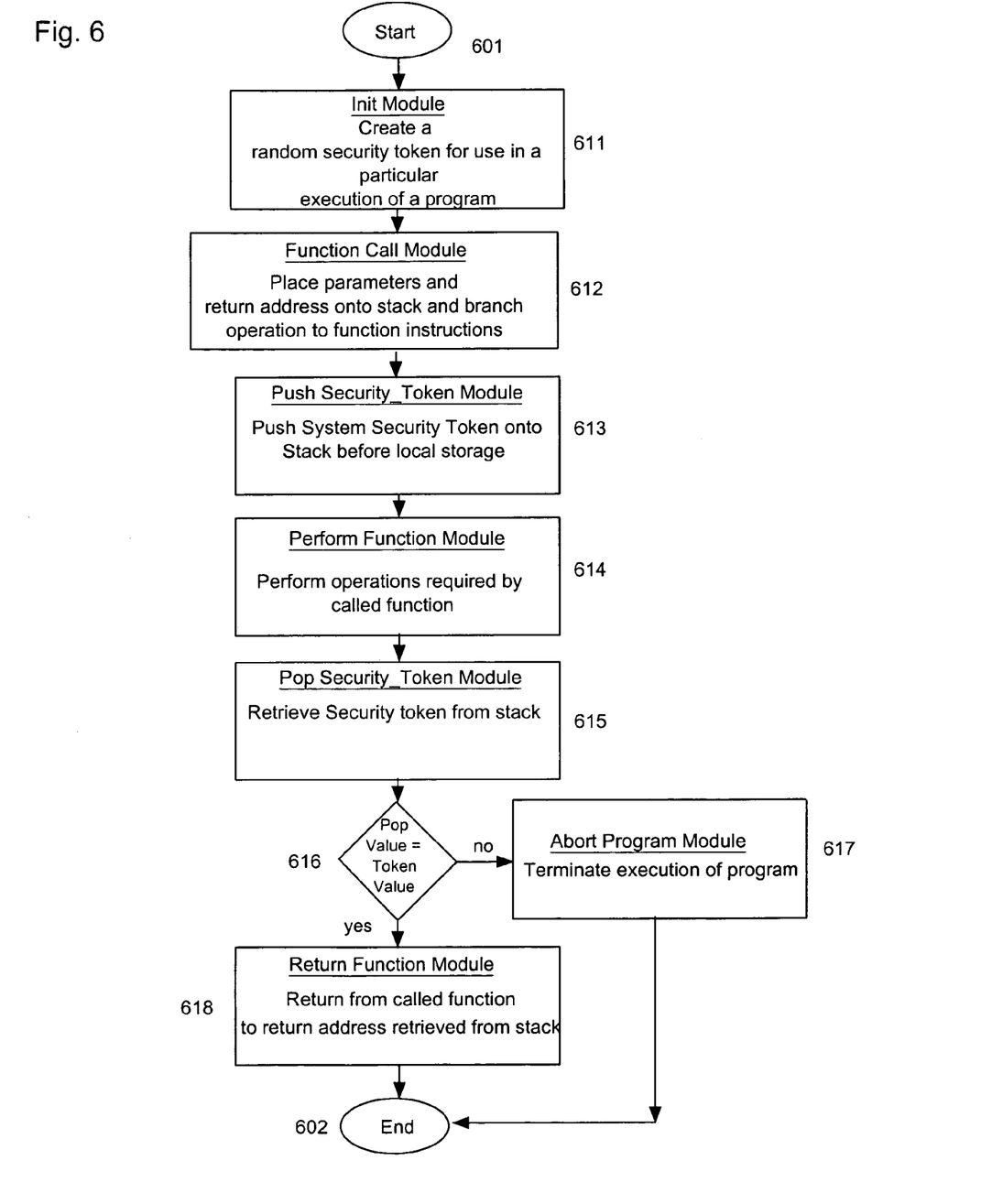
FIG. 6 illustrates an operational flow for input buffer overflow detection and prevention according to an embodiment of the present invention.

FIG. 6 illustrates an operational flow for input buffer overflow detection and prevention process according to an example embodiment of the present invention. The processing begins 601 with the calling of an Init module 611. The Init module 611 is performed once when the program begins to execute. At this time, the random value to be used for the security token 301 is generated using a random number generator. This random number generator in the exemplary embodiment uses the system clock and other system variables to generate a random number that is 32 bits in length. One skilled in the art will readily recognize that any random number generator may be used to generate a random number of a desired length when generating the value of the security token 301.

During the execution of the program, the remaining operations are performed each time a function call is specified within the computer instructions. First, a Function Call module 612 is used to place one or more function call arguments 111–113 and return address 102 on to the system stack 100. Once these values are on the stack 100, the module 612 branches to the function in question. The remaining operations are all performed within the called function, where the Function Call module 612 is actually part to of the processing module which performs the function call.

Immediately after entering the function, a Push Security Token module 613 pushes the previously generated security token 301 to the stack 100. This operation occurs before the function allocates local storage on the stack 100 for local variables or buffers 114. Once the Push Security Token module 613 has completed, the called function performs any and all operations necessary to implement its functionality in a Perform Function module 614. The Perform Function module 614 represents the developer written code that utilize the buffer overrun detection and prevention procedures according to present invention.

When the Perform Function module 614 has completed all of its operations, a Pop Security Token module 615 retrieves the security token 301 from the stack 100 before returning to the module that called the function. Test operation 616 compares the value popped off of the system stack 100 with the token value generated within the Init module 611.

If Test module 616 determines that the Pop value is not the same as the system stored token value, the processing branches to an Abort Program module 617. The Abort Program module 617 will terminate the execution of the entire program as the security token indicates that values on the stack have been altered. As such, the Subroutine Return Address 102, which is also stored on the stack 100, may not be trusted as a valid address where the processing should return.

If test module 616 determines the Pop value is the same as the systems stored token value, a Return Function module 618 returns from the call function by obtaining the Subroutine Return Address 102 from the stack and branching to the address stored in the stack location. Under either case, the processing will end 602.

Figure 7:
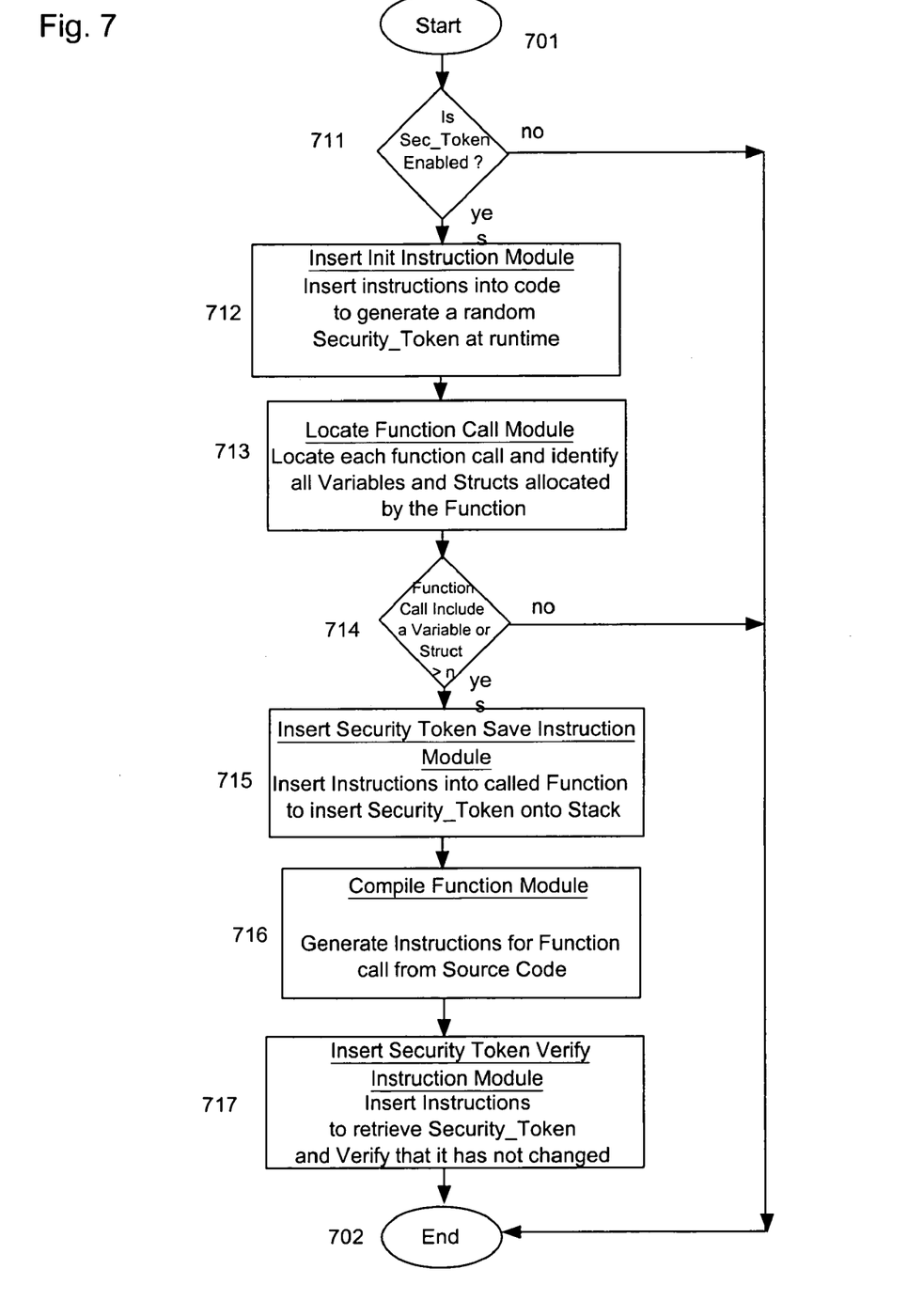
FIG. 7 illustrates an operational flow for insertion of input buffer overflow detection and prevention instructions into existing function call instructions according to another embodiment of the present invention.

FIG. 7 illustrates an operational flow for insertion of input buffer overflow detection and prevention process instructions into existing function call instructions according to another exemplary embodiment of the present invention. The sequence of instructions are typically performed by the compiler when source code written in a high level language is translated into assembly language instructions. The processing begins 701 when a test operation 711 determines whether the security token functions are enabled. The use of a security token is enabled with the setting of a switch provided as an input to a compiler at compile time. If the security token is determined not to be enabled by test operation 711, processing branches to the end 702 and the high level language is compiled normally.

If the use of the security token is enabled as detected by test operation 711, an Insert Init Instruction Module 712 inserts instructions into the beginning of the compiled code to generate a random number which is used as the security token at runtime. As discussed above, any random number generator may be used to generate a random number of any length for uses as a security token 301.

Next, a Locate function call module 713 is used to locate each function call as it is being compiled. When a function call is located the Locate Function Call module 713 identifies all local variables and structs that are allocated by the function call as data storage areas to be placed on to the stack 100.

Test operation 714 next determines whether the allocated local variables and structs within each called function included variables and structs which are greater than the predetermined length. If test operation 714 determines that the length of variables and structs is less than the predetermined value, the operation will branch to the end 702 as no code is to be inserted for this function. This processing will continue until all functions have been compiled. If a function call includes variables and structs greater in length than a predetermined value, an Inserts Security Token Save Instruction module 715 inserts instructions into the called function to insert the security token 301 onto the stack before local variables are allocated. Next, a Compile Function module 716 generates all the remaining instructions from the source code as any compiler typically does.

Once the remaining portions of the function module have been compiled by the Compile Function module 716, an Insert Security Token Verify Instruction module 717 inserts the necessary instructions into the end of the called function to retrieve a security token 301 from the stack and verify that it has not changed. Once again this entire processing is performed for each function that is compiled before the processing ends 702.

While the above embodiments of the present invention describe the interaction of a random security token inserted onto a stack between an input data buffer and a return address storage location, one skilled in the are will recognize that the use of the random security token value stored between these data structures may also be used in other portions of memory other than a stack. As long as the random security token is placed between the input buffer and storage locations containing instruction addresses given the order in which the input buffer is filled, and as long as the random security token is checked prior to the usage of be instruction addresses stored in the corresponding memory locations, the present invention to would be useable in non stack based memory structures. It is to be understood that other embodiments may be utilized and operational changes may be made without departing from the scope of the present invention.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a method, apparatus, and article of manufacture for detecting and preventing input data buffer overrun.

What is claimed is:

1. A method for preventing overrun of an input data buffer within a program having the it data buffer on a stack data structure, the program executing on a computing system, the method comprising:

pushing all arguments to a function onto the stack data structure;

pushing a return address onto the stack data structure for use in obtaining a memory address for an instruction to be executed upon completion of the function;

pushing onto the stack data structure a security token, the security token comprising a randomly generated data value determined using a random number generator once each time the program is executed, wherein the random number generator generates the randomly generated data value using a snapshot of a system clock within the computing system obtained before the program first accepts input data;

allocating memory locations on the stack data structure for use as local variables within the function;

completing instructions within the function;

retrieving the security token value from the stack data structure; and if the retrieved security token value is identical to the randomly generated data value, returning from the function using the return address stored on the stack data structure.

2. The method according to claim 1, wherein the method further comprises aborting operation of the program if the retrieved security token value is not identical to the randomly generated data value.

3. The method according to claim 1, wherein the function comprises a subroutine that does not return a data value.

4. The method according to claim 1, wherein the function comprises a subroutine that does return one or more data values.

5. An apparatus for preventing overrun of an input data buffer within a program having the input data buffer on a stack data structure, the program executing on a computing system, the apparatus comprising:

a function call module placing arguments to a function and a return address onto the stack data structure;

a push security token module placing onto the stack data structure a security token, the security token comprising a randomly generated data value determined using a random number generator once each time the program is executed wherein the random number generator generates the randomly generated data value using a snapshot of a system clock within the computing system obtained before the program first accepts input data;

a perform function module performing operations within the function, the perform function module allocating memory locations on the stack data structure for use as the input data buffer;

a pop security token module retrieving the security token from the stack data structure upon completion of operation of the perform function module;

a test module comparing the retrieved security token with the randomly generated data value; and a complete function module completing operations of the fiction;

wherein the complete function module returns from the function if the retrieved security token is determined to be identical to the randomly generated data value by the test module.

6. The apparatus according to claim 5, wherein the complete function module aborts operation of the program if the retrieved security token is determined not to be identical to the randomly generated data value by the test module.

7. The apparatus according to claim 5, wherein the function comprises a subroutine that does not return a data value.

8. The apparatus according to claim 5, wherein the function comprises a subroutine that does return one or more data values.

9. A computer program product readable by a computing system and encoding a set of computer instructions implementing a method for preventing overrun of an input data buffer within a program having the input data buffer on a stack data structure, the program executing on a computing system, the method comprising:

pushing a return address onto the stack data structure for use in obtaining a memory address for an instruction to be executed upon completion of a function;

pushing onto the stack data structure a security token, the security token comprising a randomly generated data value determined using a random number generator once each time the program is executed wherein the random number generator generates the randomly generated data value using a snapshot of a system clock within the commuting system obtained before the program first accepts input data;

completing the instructions within the fiction;

retrieving the security token value from the stack data structure;

if the retrieved security token value is identical to the randomly generated data value, returning from the function using the ret address stored on the stack data structure.

10. The computer program product according to claim 9, wherein the method further comprises aborting operation of the program if the retrieved security token value is not identical to the randomly generated data value.

11. The computer program product according to claim 9, wherein the function comprises a subroutine that does not return a data value.

12. The computer program product according to claim 9, wherein the function comprises a subroutine that does returns return one or more data values.

13. The computer program product according to claim 9, wherein the computer data product comprises a set of computer instructions encoded and stored onto a computer-readable storage medium.

14. The computer program product according to claim 9, wherein the computer data product comprises a set of computer functions encoded within a carrier wave for transmission between computing systems.

* * * * *

UNITED STATES PATENT AND TRADEMARK OFFICE
CERTIFICATE OF CORRECTION

| | |
|---|---|
| PATENT NO. | : 6,993,663 B1 |
| APPLICATION NO. | : 09/653618 |
| DATED | : January 31, 2006 |
| INVENTOR(S) | : Cem Paya et al. |

It is certified that error appears in the above-identified patent and that said Letters Patent is hereby corrected as shown below:

In column 3, line 18, delete "performed" and insert -- performed. --, therefor.

In column 3, line(s) 18-20, delete "FIG. 2 illustrates a general purpose computing system for use in implementing as one or more computing embodiments of the present invention." and insert -- FIG. 2 illustrates a general purpose computing system for use in implementing as one or more computing embodiments of the present invention. --, therefor, on line 19 as a new paragraph.

In column 6, line 33, after "115" delete "the".

In column 7, line(s) 25-30, delete "With these operations performed, the function FOO may now perform instructions to implement the desired functionality. These instructions may be as simple or complex as necessary and may include additional function calls which utilize the buffer overrun detection and prevention operations according to the present invention." and insert -- With these operations performed, the function FOO may now perform instructions to implement the desired functionality. These instructions may be as simple or complex as necessary and may include additional function calls which utilize the buffer overrun detection and prevention operations according to the present invention. --, therefor, on line 24 after "114." as a continuation of the paragraph.

In column 8, line 14, delete "an" and insert -- a --, therefor.

In column 8, line 50, after "to" insert -- be --.

In column 11, line 6, in Claim 1, delete "it" and insert -- input --, therefor.

In column 11, line 50, in Claim 5, delete "executed" and insert -- executed, --, therefor.

In column 12, line 2, in Claim 5, delete "fiction;" and insert -- function; --, therefor.

In column 12, line 30, in Claim 9, delete "executed" and insert -- executed, --, therefor.

UNITED STATES PATENT AND TRADEMARK OFFICE
CERTIFICATE OF CORRECTION

PATENT NO. : 6,993,663 B1
APPLICATION NO. : 09/653618
DATED : January 31, 2006
INVENTOR(S) : Cem Paya et al.

It is certified that error appears in the above-identified patent and that said Letters Patent is hereby corrected as shown below:

In column 12, line 33, in Claim 9, delete "commuting" and insert -- computing --, therefor.

In column 12, line 35, in Claim 9, delete "fiction;" and insert -- function; --, therefor.

In column 12, line 41, in Claim 9, delete "ret" and insert -- return --, therefor.

In column 12, line 52, in Claim 12, delete "returns" before "return".

In column 12, line 60, in Claim 14, delete "functions" and insert -- instructions --, therefor.

Signed and Sealed this

Twenty-first Day of July, 2009

JOHN DOLL
*Acting Director of the United States Patent and Trademark Office*